United States Patent [19]

Tanaka et al.

[11] 4,394,813
[45] Jul. 26, 1983

[54] EXHAUST GAS HEAT RECOVERY SYSTEM IN INTERNAL COMBUSTION ENGINE

[75] Inventors: Yoshiharu Tanaka, Machida; Yoshiaki Watanabe; Kou Sasaki, both of Kawasaki, all of Japan

[73] Assignee: Mitsui Engineering and Shipbuilding Company Limited, Tokyo, Japan

[21] Appl. No.: 304,600

[22] Filed: Sep. 22, 1981

[30] Foreign Application Priority Data

Dec. 25, 1980 [JP] Japan ................... 55-184755

[51] Int. Cl.$^3$ .............................. F01K 23/10
[52] U.S. Cl. ................... 60/618; 60/39.182; 60/677
[58] Field of Search ............. 60/618, 677, 39.18 B

[56] References Cited

U.S. PATENT DOCUMENTS

| | | | |
|---|---|---|---|
| 4,232,522 | 11/1980 | Steiger | 60/618 |
| 4,300,353 | 11/1981 | Ridgway | 60/618 |
| 4,354,347 | 10/1982 | Tomlinson | 60/39.18 B |

FOREIGN PATENT DOCUMENTS 55-109708 8/1980 Japan ............... 60/39.18 B
2033017 5/1980 United Kingdom ........... 60/618

OTHER PUBLICATIONS

S.E.M.T. Pielstick: "Introducing the PC-2-6 Engine", p. 13.

Primary Examiner—Douglas Hart
Attorney, Agent, or Firm—Parkhurst & Oliff

[57] ABSTRACT

An exhaust gas heat recovery system wherein:

the system comprises an exhaust gas economizer having of heat transfer sections including a preheating section, an evaporating section and a superheating section, a feed water heater, a steam separation drum, a low pressure steam generator; and a mixed-pressure turbine;

a temperature gradient of circulating water and a temperature gradient of exhaust gases are made substantially equal to each other in the preheating section of the exhaust gas economizer to prevent an exhaust gas economizer tube from being corroded by generated sulfuric acid; and low pressure steam can be effectively utilized by use of the mixed-pressure turbine.

4 Claims, 3 Drawing Figures

EXHAUST GAS HEAT RECOVERY SYSTEM IN INTERNAL COMBUSTION ENGINE

BACKGROUND OF THE INVENTION

1. Field of the Invention

This invention relates to exhaust gas heat recovery systems in internal combustion engines, and particularly to an exhaust gas heat recovery system wherein exhaust gases in the internal combustion engine such as a diesel engine, gas turbine and the like are utilized to generate steam which is used as the steam for driving a turbine for an electric generator and the steam for miscellaneous uses.

2. Description of the Prior Art

Heretofore, there has been known an exhaust gas heat recovery system in a diesel engine for use in a ship and the like, wherein steam is generated by an exhaust gas economizer as shown in FIG. 1. The system shown in FIG. 1 principally comprises: an exhaust gas economizer 1 incorporating therein tube nests such as a preheating section 11, an evaporating section 12 and a superheating section 13; a feed water heater 4 for heating feed water fed to a steam separation drum 2 (for cooling circulating feed water fed to the preheating section 11 and the evaporating section 12 of this exhaust gas economizer); a steam separation drum 2 for separating steam from a fluid of steam-water mixture discharged from the evaporating section; and a turbine 21 (which is connected to a generator), to which is fed superheated steam from the superheating section 13.

In the abovedescribed arrangement, the exhaust gas discharged from the internal combustion engine is introduced to the economizer 1 as indicated by an arrow Qg, where it generates steam, the heat quantity of which is recovered. A supply of feed water is fed by a main feed water pump 7 through a surface type feed water heater 4 to the steam separation drum 2, which is common in use as a steam drum for an auxiliary boiler, and thereafter is introduced by a feed water circulating pump 3 to the preheating section 11 of the exhaust gas economizer 1 through the feed water heater 4 and a piping 4A, subsequently, generates steam in the evaporating section 12; and thereafter, is discharged into the main stream separation drum 2 as the fluid of steam-water mixture. A saturated steam separated in the steam separation drum 2 is used as the steam for miscellaneous uses for heating a part of fuel oil and the like, a drain thereof is introduced to a drain tank 26, the remaining part of steam is introduced to the superheating section 13 of the exhaust gas economizer 1 and drives a steam turbine 21 for a turbo-generator as the superheated steam, exhausted steam is condensed into water in the condenser 23, the water is discharged into the drain tank 26 by a condenser pump 24, subsequently, sucked by the main water feed pump 7, and returned to the feed water heater 4.

Changes in temperature at the side of the exhaust gases and at the side of the circulating feed water in the exhaust gas economizer 1 of the conventional system described above are indicated by solid lines in FIG. 2. In FIG. 2, $T_i$ is a temperature at an exhaust gas inlet of the exhaust gas economizer 1, $T_0$ a temperature at an exhaust gas outlet, $T_1$ a temperature of the exhaust gases between the preheating section 11 and the evaporating section 12 of the exhaust gas economizer 1, $T_2$ a temperature of the exhaust gases between the evaporating section 12 and the superheating section 13 of the economizer 1, $t_i$ a temperature at a circulating water inlet of the preheating 11, $t_s$ a saturation temperature of the circulating feed water at the evaporating section 12, $t_0$ a temperature at a superheated steam outlet of the superheating section 13, $\Delta t_0$ a difference in terminal temperature between the temperature $t_i$ at the circulating feed water inlet of the preheating section 11 and the temperature $T_0$ at the exhaust gas outlet, and $\Delta t_1$ a difference in terminal temperature between the temperature $t_s$ at the circulating feed water outlet of the preheating section 11 and the temperature $T_1$ at the exhaust gas outlet of the evaporating section 12.

Now, in order to improve the rate of recovery of the exhaust gas heat in an internal combustion engine, it is necessary to lower the temperature $T_0$ at the exhaust gas outlet of the exhaust gas economizer 1 as low as possible. When the temperature $T_0$ at the exhaust gas outlet of the exhaust gas economizer 1 is lowered, the following items must be considered.

(1) It is important to hold a temperature $t_i$ of the circulating feed water at the inlet of the preheatiang section 11 of the exhaust gas economizer 1 to predetermined temperatures or thereabove, and to raise the surface temperature of a tube of the exhaust gas economizer for preventing corrosion by generated sulfuric acid due to the sulfur content contained in the exhaust gas.

(2) It is important to keep $\Delta t_1$ a difference in terminal temperature between the saturation temperature $t_s$ of the steam-water mixture and the temperature $T_1$ of the exhaust gas in the evaporating section 12 to 15°~20° C. for making proper the size of the exhaust gas economizer 1.

However, when the temperature $t_i$ of the circulating feed water at the inlet of the preheating section 11 of the exhaust gas economizer 1 is held at a predetermined temperature (normally 130°–140° C.), if the difference $\Delta t_1$ in terminal temperature at the evaporating section 12 of the exhaust gas economizer 1 is set at a prdetermined temperature (15°–20° C.), it becomes impossible to satisfactorily lower the exhaust gas outlet temperature at the outlet of the exhaust gas economizer 1, so that the rate of heat recovery of the exhaust gases cannot be improved, and, when the temperature $T_0$ at the exhaust gas outlet is lowered to a tolerance value to improve the rate of recovery of the exhaust gases, such a disadvantage has been presented that it is unavoidable to lower the feed water temperature $t_i$ at the inlet of the preheating section 11 of the exhaust gas economizer to a level where there exists a possibility of the sulfuric acid corrosion.

SUMMARY OF THE INVENTION

The present invention has been developed to obviate the abovedescribed disadvantages of the prior art and has as its object the provision of an exhaust gas heat recovery system in an internal combustion engine wherein the rate of heat recovery can be improved while corrosion by generated sulfuric acid caused to the heat transfer tube of the exhaust gas economizer is prevented.

The exhaust gas heat recovery system in an internal combustion engine according to the present invention is of such an arrangement that superheated steam is supplied from the superheating section of the exhaust gas economizer to the high pressure side of a mixed-pressure turbine, and low pressure steam is supplied from a low pressure steam generator provided on a piping leading from a steam separation drum to a feed water heater to the low pressure side of the mixed-pressure turbine to drive the turbine, thereby enabling to achieve the desired object.

DESCRIPTION OF THE PREFERRED EMBODIMENT

Figure 1:
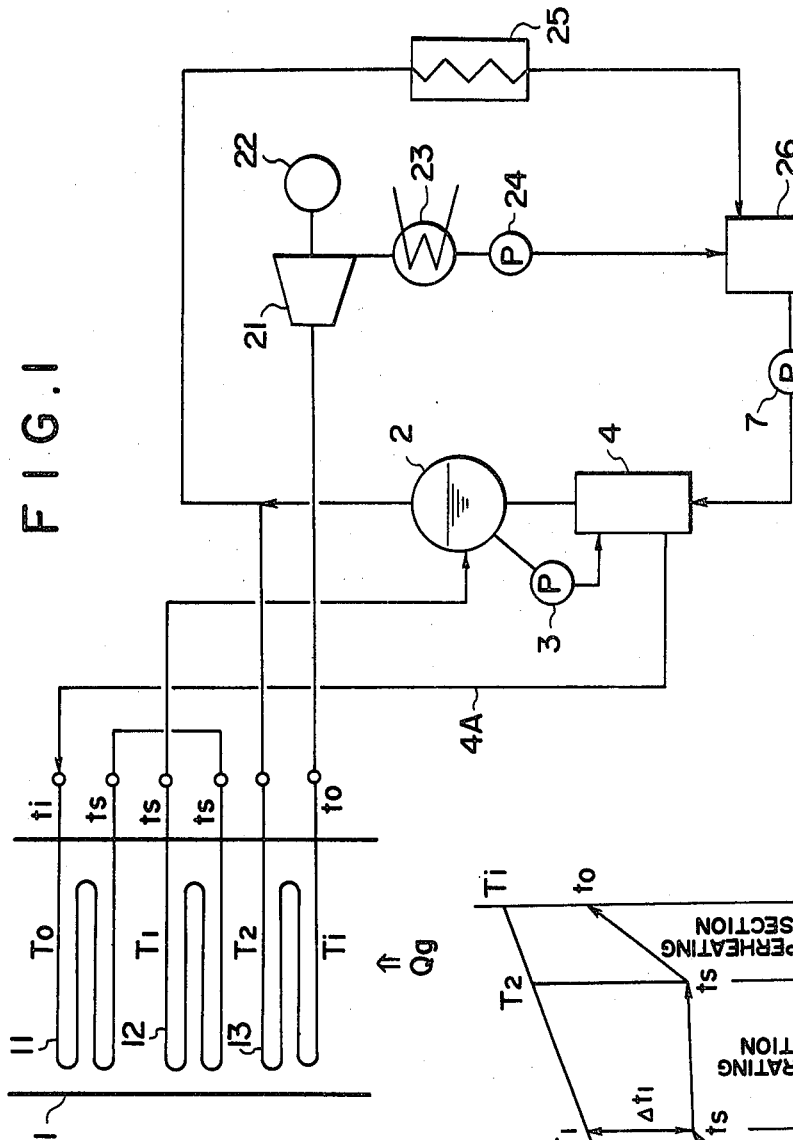
FIG. 1 is a system diagram showing the conventional exhaust gas heat recovery system.
Figure 3:
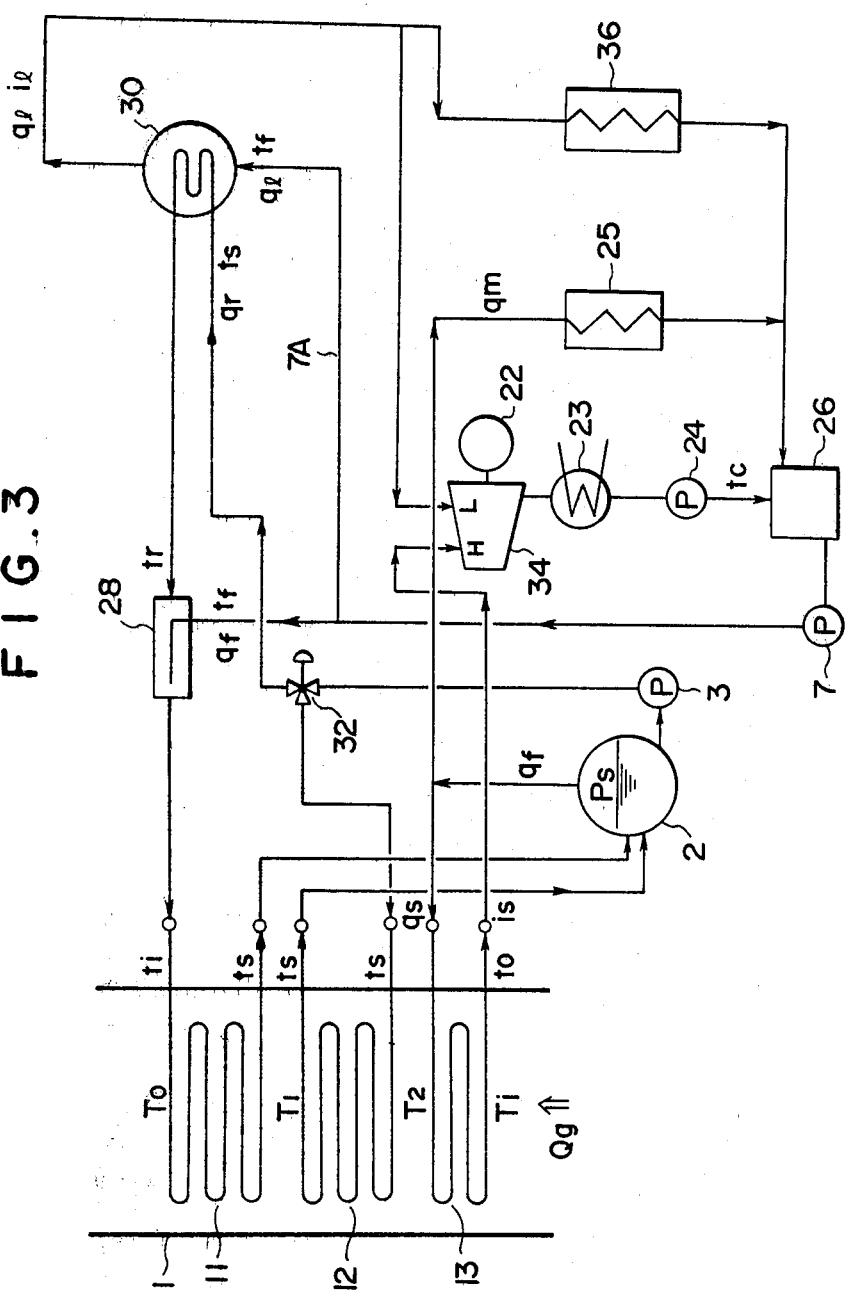
FIG. 3 is a system diagram showing one embodiment of the present invention.

This embodiment shown in FIG. 3 is different from the conventional system shown in FIG. 1 in that it uses a mixing type feed water heater 28 instead of a surface type feed water heater 4 used in the conventional system. This mixing type feed water heater 28 is adapted to feed water to the preheating section 11 of the economizer 1. Furthermore, a low pressure steam generator 30 as a heat exchanger is provided on a piping leading from the main steam separation drum 2 to the feed water heater 28, and a control valve 32 is provided between this low pressure steam generator 30 and the feed water circulating pump 3, so that the circulating water from the feed water circulating pump 3 can be also fed to the evaporatiang section 12 of the exhaust gas economizer. The circulating water is controlled in flow rate by the control valve 32 to control the temperature of the circulating water at the inlet of the preheating section of the exhaust gas economizer.

As differed from the conventional example, in this embodiment, a mixed-pressure turbine 34 as a generating steam turbine is provided, superheated steam from the superheating section 13 of the exhaust gas economizer 1 is fed to the high pressure side H of this mixed-pressure turbine 34 and low pressure steam from the low pressure steam generator 30 is fed to the low pressure side L of this mixed-pressure turbine 34, respectively. Furthermore, for a part of the low pressure steam from the low pressure steam generator 30 is provided a piping separated from a feed piping to the lower pressure side of the mixed-pressure turbine 34 and led to a drain tank 26 through a miscellaneous services 36.

The arrangement in this embodiment other than the above is similar to that of the conventional example and same reference numerals are used to designate same or similar parts.

Referring to FIG. 3, circulating water qr supplied from the steam separation drum (or boiler steam drum) 2 through the control valve 32 by means of the feed water circulating pump 3 is fed as a heating water to the low pressure steam generator 30, where it generates low pressure steam ql. Feed water qf supplied from the main water feed pump 7 reaches the mixing type water heater 28, wher it is mixed with the circulating water qr fed from the feed water circulating pump 3 through the low pressure steam generator 30 and heated, then the water thus mixed and heated is fed to the preheating section of the exhaust gas economizer 1.

The water fed to this preheating section 11, while passing through the preheating section 11, undergoes heat exchange with the exhaust gases Qg from the internal combustion engine, and thereupon, is fed to the main steam separation drum 2 as a saturated water.

The water led into the low pressure steam generator 30 from the main water feed pump 7 through a piping 7A is turned into low pressure steam ql in this low pressure steam generator 30, and part of the resultant low pressure steam ql is introduced to the miscellaneous services 36, and thereafter, led to the drain tank 26. Additionally, a part of this low pressure steam ql is fed to the low pressure side L of the mixed-pressure turbine 34 for the driving.

While, part of the circulating water sucked from the steam separation drum (or boiler steam drum) 2 by means of the feed water circulating pump 3 is led to the evaporating section 12 of the exhaust gas economizer 1 through the control valve 32, and then, introduced to the steam separation drum 2 as a fluid of steam-water mixture. A part of saturated steam separated in this steam separation drum 2 is led into the heating services 25 such as a fuel oil heater for the engine as a heating steam qm requiring comparatively high pressure. The remaining saturated steam is superheated in the superheating section 13 of the exhaust gas economizer 1, introduced into the high pressure side H of the mixed-pressure turbine 34, drives the mixed-pressure turbine in cooperation with the low pressure steam L, thereafter, is condensed in the condenser 23, and then, led into the drain tank 26 by means of a condenser pump 24.

Figure 2:
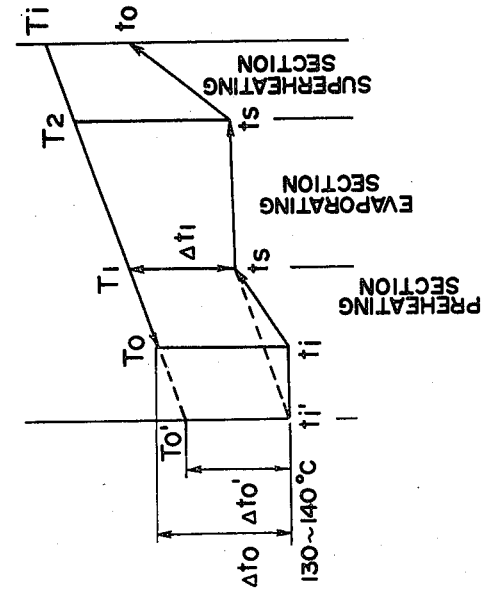
FIG. 2 is a chart showing the changes in temperature in the respective sections of the exhaust gas economizer.

In this embodiment, when the capacity of the feed water circulating pump is determined such that a temperature gradient $t_f \rightarrow t_s$ at the side of the circulating feed water is made substantially equal to a temperature gradient $T_1 \rightarrow T_0$ at the side of the exhaust gases in the preheating section 11 of the exhaust gas economizer, a difference in temperature of the exhaust gases at the inlet and outlet of the preheating section 11 of the exhaust economizer and a difference in temperature of the circulating feed water at the inlet and outlet of the preheating section 11 of the exhaust gas economizer can be made equal to each other as indicated by a dotted line in FIG. 2, and by means of the low pressure steam generator 30, the temperature $t_f'$ of the circulating feed water at the inlet of the exhaust gas economizer tube can be set at the lowest tolerance temperature for preventing corrosion by generated sulfuric acid caused to the exhaust gas economizer tube (about 130° to 140° C.). Consequently, in addition to the prevention of corrosion by the generated sulfuric acid, the outlet temperature of the exhaust gases can be lowered, thereby enabling to improve the heat recovery rate. Further, low pressure steam can be economically used, and particularly, in the case of ships, in which only a turbo generating system cannot supply a power required for the internal use of the ship, and further, a diesel generator and/or a shaft generator in parallel operation with the turbo generating system are required, increased generated power can be expected, thus enabling to economize the fuel consumption to a considerable extent.

Additionally, in this embodiment, the saturated water heated in the preheating section 11 of the exhaust gas economizer 1 is adapted to be directly introduced into the steam separation drum 2, whereby, if evaporation occurs in the preheating section 11, the resultant steam is immediately led to the steam separation drum 2, so that the exhaust gas economizer 1 can be prevented from being damaged due to vapor lock to a great extent.

As has been described hereinabove, according to the present invention, the temperature of the circulating feed water at the inlet of the exhaust gas economizer can be held at a predetermined value or thereabove to prevent the exhaust gas economizer from corrosion by the generated sulfuric acid, the outlet temperature of the exhaust gases can be reduced to the lowest tolerance value of the difference in terminal temperature between the inlet temperature of the feed water and itself, and the low temperature steam can be effectively utilized by use of the mixed-pressure turbine, thereby enabling to improved the exhaust gas heat recovery rate by far better than that of the prior art.

What is claimed is:

1. An exhaust gas heat recovery system in an internal combustion engine, comprising: an exhaust gas economizer having heat transfer sections including a preheating section, an evaporating section and a superheating section; a feed water heater for heating water fed to said heat transfer sections of the exhaust gas economizer; a steam separation drum for separating steam and saturated water from fluid of steam-water mixture discharged from the exhaust gas economizer; a mixed-pressure turbine having a high pressure side and a low pressure side, a piping for feeding part of the steam separated in said steam separation drum to said superheating section of the exhaust gas economizer and further transferring said steam to the high pressure side of said mixed-pressure turbine; a piping for feeding part of the saturated water separated in said steam separation drum to said feed water heater and said evaporating section of the exhaust gas economizer, respectively; a low pressure steam generator provided in said piping for returning the saturated water separated in said steam separation drum to said feed water heater; a piping for feeding low pressure steam in said low pressure steam generator to the low pressure side of said mixed-pressure turbine; and a piping for condensing exhausted steam from the mixed-pressure turbine in a condenser and thereafter circulating the water thus condensed to said feed water heater.

2. An exhaust gas heat recovery system in an internal combustion engine as set forth in claim 1, wherein said feed water heater is a mixing type feed water heater.

3. An exhaust gas heat recovery system in an internal combustion engine as set forth in claim 1, wherein a control valve is provided at the intermediate portion of a piping interconnecting a low pressure steam generator and the steam separation drum.

4. An exhaust gas heat recovery system in an internal combustion engine as set forth in claim 3, comprising means for feeding a part of the saturated water separated in said main steam separation drum to the evaporating section of the exhaust gas economizer through said control valve.

* * * * *